United States Patent
McNabb et al.

(10) Patent No.: US 7,275,714 B2
(45) Date of Patent: Oct. 2, 2007

(54) AIRSHIP DOCKING MECHANISM

(75) Inventors: Michael McNabb, Huntsville, AL (US); Callum R. Sullivan, New Market, AL (US); James H. Boschma, Jr., Huntsville, AL (US); Glenn Martin Tierney, Huntsville, AL (US)

(73) Assignee: Information Systems Laboratories, Inc., San Diego, CA (US)

( * ) Notice: Subject to any disclaimer, the term of this patent is extended or adjusted under 35 U.S.C. 154(b) by 7 days.

(21) Appl. No.: 11/263,774

(22) Filed: Nov. 1, 2005

(65) Prior Publication Data

US 2007/0095974 A1 May 3, 2007

(51) Int. Cl.
*B64B 1/02* (2006.01)
(52) U.S. Cl. .................. 244/115; 244/30; 244/125; 244/110 R
(58) Field of Classification Search .................. 244/30, 244/25–28, 125, 126, 128, 110 R, 110 F, 244/115, 116
See application file for complete search history.

(56) References Cited

U.S. PATENT DOCUMENTS

| | | | |
|---|---|---|---|
| 1,370,043 A | | 3/1921 | Preston |
| 1,634,964 A | * | 7/1927 | Steinmetz ................... 244/115 |
| 1,700,001 A | * | 1/1929 | Thaden ........................ 244/115 |
| 2,386,814 A | * | 10/1945 | Rosendahl et al. ......... 244/116 |
| 3,387,805 A | | 6/1968 | Barnett et al. |
| 3,905,567 A | | 9/1975 | Menke et al. |
| 4,402,479 A | | 9/1983 | Phipps, III et al. |
| 5,096,141 A | * | 3/1992 | Schley ......................... 244/25 |
| 5,497,962 A | * | 3/1996 | Wood .......................... 244/116 |
| 6,715,712 B2 | | 4/2004 | Boschma, Jr. |

* cited by examiner

*Primary Examiner*—J. Woodrow Eldred
(74) *Attorney, Agent, or Firm*—Nydegger & Associates

(57) ABSTRACT

A system and method for docking an airship to a mooring mast includes a thruster that is mounted to the fore end of the airship. When activated, the thruster generates a thrust vector that is substantially perpendicular to the longitudinal axis of the airship and is selectively directional. In particular, the configuration of the thruster can be changed to vary the direction of the thrust vector around the longitudinal axis to maneuver a connector on the thruster into contact with the mooring mast. Engagement of the connector to the mooring mast then docks the airship to the mooring mast.

20 Claims, 4 Drawing Sheets

AIRSHIP DOCKING MECHANISM

FIELD OF THE INVENTION

The present invention pertains generally to docking systems for airships. More particularly, the present invention pertains to docking systems that incorporate a thruster, which maneuvers the fore end of an airship into contact with a mooring mast during the docking of the airship. The present invention is particularly, but not exclusively useful as a system and method for docking an airship to a mooring mast wherein the thruster uses elongated airfoil blades to generate aerodynamic thrust for maneuvering the airship.

BACKGROUND OF THE INVENTION

While advances in technology have improved many aspects of airship operations, docking an airship to a mooring mast still remains a labor intensive and operationally difficult task. In fact, the majority of accidents involving lighter-than-air airships occur during a docking procedure.

In general, docking an airship requires releasing mooring lines from the airship, which are then grasped by a ground crew. Next, the ground crew directs the nose section of the airship into an anchoring mechanism on the mooring mast. While this process is time-consuming and difficult under ideal conditions, if winds are gusting or there are significant up and down drafts, docking becomes an ever more difficult process. This is primarily due to the large cross-sectional area of airships and their otherwise limited maneuverability.

In light of the above, it is an object of the present invention to provide a system and method for docking a lighter-than-air airship to a mooring mast that uses a thruster mounted on the fore end of the airship to maneuver the fore end of the airship into position for docking. It is another object of the present invention to reduce the required number of ground crew members by providing additional airborne maneuverability to airships during the docking process. It is yet another object of this invention to make the docking process for airships safer. Still another object of the present invention is to provide a docking system for lighter-than-air airships that is easy to use, relatively simple to implement, and comparatively cost effective.

SUMMARY OF THE INVENTION

The present invention is directed to a docking system that operates to maneuver a lighter-than-air airship into position for docking the airship to a mooring mast. In general, the airship defines a longitudinal axis and it can be of a rigid, semi-rigid, or non-rigid type construction. As envisioned for the present invention, the docking system includes a thruster that is mounted in alignment with the longitudinal axis at the fore end of the airship. When activated, the thruster generates a thrust vector that is substantially perpendicular to the longitudinal axis of the airship. Further, this thrust vector is selectively directional around the longitudinal axis to maneuver the fore end of the airship. Docking of the airship is then accomplished by maneuvering the fore end of the airship with the thruster until a connector, which may be mounted on the thruster, engages with the mooring mast. Engagement of the connecter with the mooring mast then docks the airship to the mooring mast.

Structurally, the thruster of the present invention includes a first hub that defines a hub axis. In its orientation on the airship, the first hub is mounted at the fore end of the airship and its hub axis is collinear with the longitudinal axis of the airship. Additionally, a plurality of equally spaced-apart blade gears are mounted on the periphery of the first hub for rotation with the first hub. Also, an airfoil blade is fixedly attached to each of the blade gears, for movement with the respective blade gear. In more detail, the blades are elongated to define a blade axis, and each blade is mounted With its blade axis substantially perpendicular to the first hub. Thus, each blade extends from the first hub, substantially parallel to the longitudinal axis of the airship. Further, each airfoil also defines a chord line that extends from the leading edge to the trailing edge of the airfoil blade. In this configuration, when the first hub is rotated, each airfoil blade will travel on a circular blade path around the longitudinal axis of the airship and generate aerodynamic forces. The thruster may also include a second hub that is connected to the ends of the airfoil blades, opposite the first hub.

Control over the aerodynamics forces generated by each airfoil blade is provided by a dedicated gear assembly that collectively includes the blade gear mentioned above, a mid-gear, and a center gear. In their relationship to each other, the mid-gear is intermeshed between the blade gear and the center gear. Further, a link interconnects the center of the blade gear to the center of the mid-gear, and another link interconnects the center of the mid-gear to the center of the center gear. In addition, all three gears are substantially the same diameter and are coplanar with each other. Within this assembly, the blade gear, mid-gear, and center gear can be rotated about their respective axes. Thus, when the first hub is rotated, the blade gear urges against the mid-gear, which in turn, urges against the center gear. Meanwhile, the centers of the various gears remain connected by the links, resulting in the simultaneous rotation of all three gears.

As envisioned for the present invention, several gear assemblies will be incorporated into the first hub. The respective center gears will then establish a gear cluster in which all of the center gears rotate about a common center gear axis. For purposes of disclosure, the common center gear axis will always be substantially parallel with the longitudinal axis of the airship.

In operation, the thruster is activated by rotating the first hub. Because each blade gear is mounted near the periphery of the first hub, the airfoil blades that are mounted on the blade gears are respectively driven along the blade path around the longitudinal axis of the airship. Rotation of the blade gear along the blade path results in the rotation of the blade gear, mid-gear, and center gear about their respective axes. Further, rotation of the blade gear about the blade gear axis causes the airfoil blade and the chord line of each airfoil blade to rotate as well. Thus, as the first hub rotates, the airfoil blade travels on the blade path and the chord line simultaneously rotates about the blade axis. In this motion, the chord line of the airfoil blade remains substantially tangential to the blade path during the rotation of the first hub.

For thrust and control purposes, cyclical variations of the respective angles of attack for each airfoil blade (i.e. the relationship between the chord line and the blade path) are introduced by moving the cluster of center gears. In greater detail, this movement is accomplished by moving the cluster of center gears omni-directionally in a plane such that the common center gear axis remains substantially parallel to the longitudinal axis of the airship. As a consequence, for each location of the center gear axis, changes in the respective angles of attack of each airfoil blade remain azimuthally uniform as the airfoil blades rotate about the longitudinal axis.

It is well known that when an airfoil passes through a fluid medium at some angle between the airfoil and the relative direction of the passing fluid medium, a force is produced. Lift is the component of the force that is perpendicular to the relative direction of the passing fluid medium. Thus, in the present invention, as the airfoil blades travel along the blade path, each airfoil blade produces a lift force. When the lift forces produced by the various airfoil blades are summed, a single resultant thrust vector is produced. Consequently, the direction of this thrust vector is controlled by cyclically changing the angle of attack of each airfoil blade in the manner previously described.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
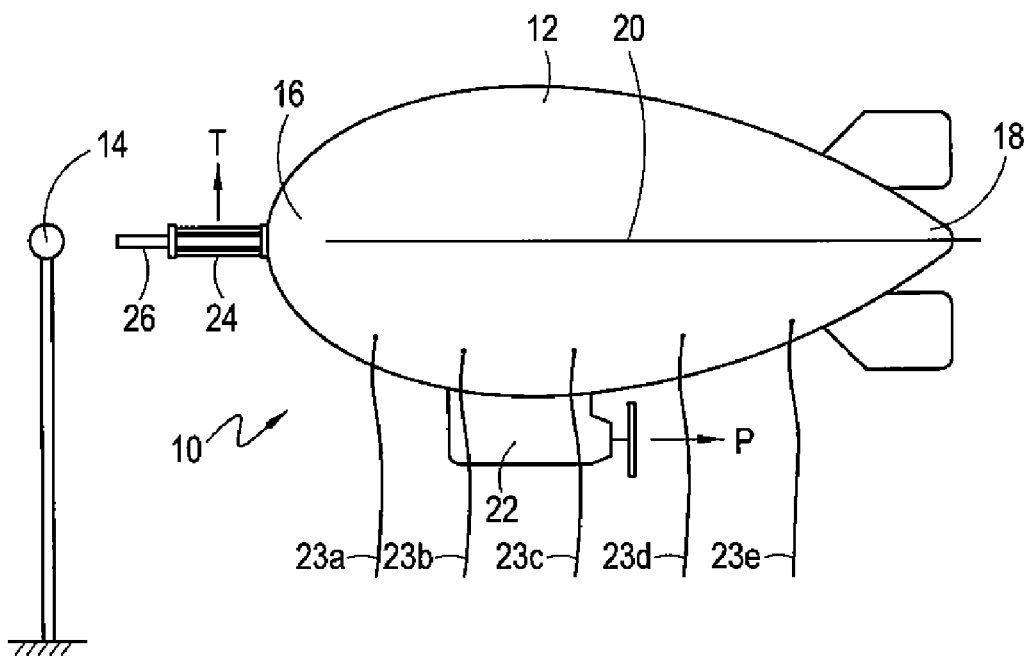
FIG. 1. is an elevation view of an airship docking system in accordance with the present invention.

Referring initially to FIG. 1, a docking system in accordance with the present invention is shown and generally designated 10. As shown in FIG. 1, the system 10 includes an airship 12 and a mooring mast 14. As further shown, the airship 12 includes a fore end 16, an aft end 18, a longitudinal axis 20 extending between the fore end 16 and the aft end 18, a propulsion unit 22, and mooring lines 23a-e. It is to be appreciated that a thruster 24 (best seen in FIG. 2) is mounted on the fore end 16 of the airship 12 for generating a thrust vector (T) that is substantially perpendicular to the longitudinal axis 20 and selectively directional. Further, the propulsion unit 22 generates a propulsion force (P). Working together, the propulsion unit 22 and the thruster 24 maneuver the airship 12 until the connecter 26, which is attached to the thruster 24, engages with the mooring mast 14. Engagement of the connector 26 with the mooring mast 14 docks the airship 12 to the mooring mast 14.

Figure 2:
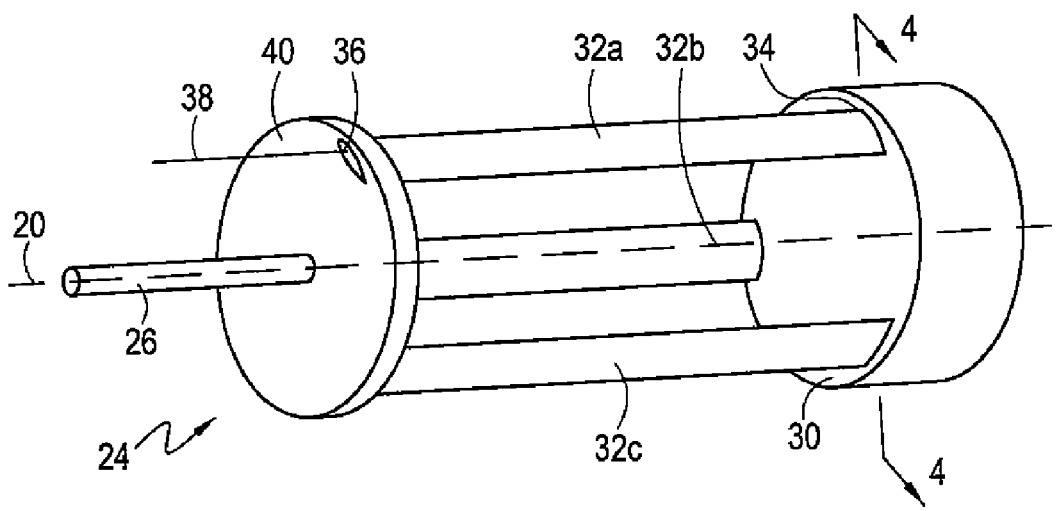
FIG. 2 is a perspective view of the thruster that is mounted on the fore end of the airship.

Referring now to FIG. 2 it can be seen that the thruster 24 includes a hub 30. As shown, a plurality of airfoil blades 32 are rotatably mounted to the periphery of the hub 30. As contemplated by the present invention, it is to be appreciated that the blades 32a, 32b, and 32c are only exemplary. Further, the airfoil blades 32 have two ends, 34 and 36, with end 34 mounted on hub 30. As intended in the present invention, the plurality of blades 32 can be rotated with the hub 30 about the longitudinal axis 20. Another hub 40 is mounted on the end 36 of blade 32.

Still referring to FIG. 2, each blade 32 has a blade axis 38 that generally extends in a direction from the end 34 to the end 36. Using this structure as a base for reference, the aerodynamic properties of the blade 32 will be better appreciated with reference to FIG. 3.

Figure 3:
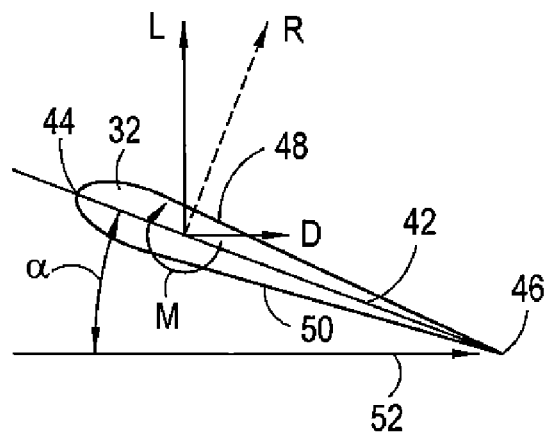
FIG. 3 is a cross-sectional view of a typical airfoil with representative aerodynamic forces acting on the airfoil.

As shown In FIG. 3, it can be seen that each blade 32 defines a chord line 42 extending from the leading edge 44 of the blade 32 to its trailing edge 46. Depending upon several factors, which include the respective design shapes of the upper surface 48 and the lower surface 50 of the blade 32, and the angle of attack ($\alpha$) between the chord line 42 and the relative wind 52, an aerodynamic force (R) will be generated on the blade 32 in accordance with well known aerodynamic principles. Specifically, as shown in FIG. 3, the components of the force (R) will include lift (L) and drag (D), as well as a moment (M). For purposes of this disclosure, it is sufficient to appreciate that these forces are generated on the blade 32 in response to a relative wind 52, and that these forces can be controlled by properly orienting the blade 32 with the relative wind 52 (i.e. by changing the angle of attack, $\alpha$). How this is accomplished for the present invention is best considered with reference to FIG. 4.

Figure 4:
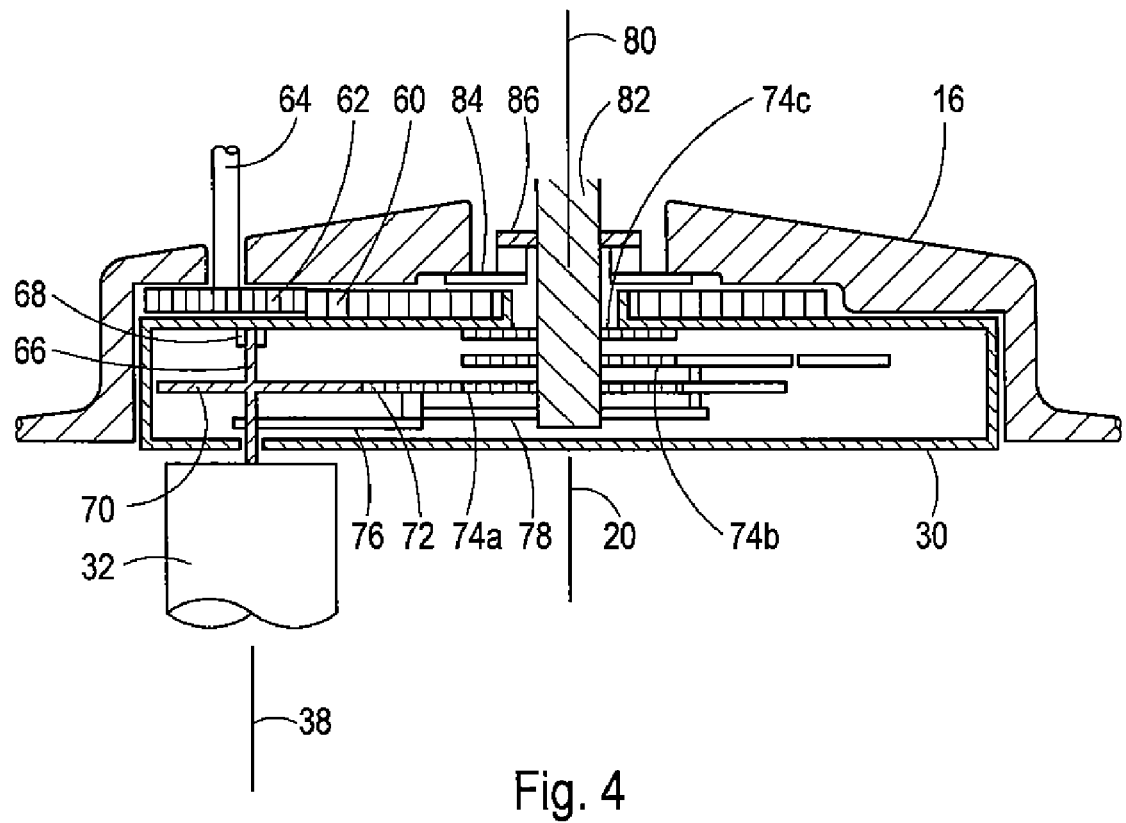
FIG. 4 is a cross-sectional view of a first hub assembly for the system of the present invention as seen along the line 4-4 in FIG. 2.

In FIG. 4, it is to be appreciated that a hub gear 60 is fixedly attached to the hub 30. Consequently, the rotation of a drive gear 62 by a drive shaft 64 causes the hub 30 to rotate relative to the airship 12. It is also to be appreciated that the blade 32 is fixed to a blade shaft 66, which in turn is held onto the hub 30 by a pivot mount 68. As intended by the present invention, the blade 32 is driven in rotation about the longitudinal axis 20 by the hub 30 while, at the same time, the blade 32 is free to rotate about the blade axis 38. FIG. 4 also shows that a blade gear 70 is attached to the blade shaft 66 for rotation therewith.

Figure 5A:
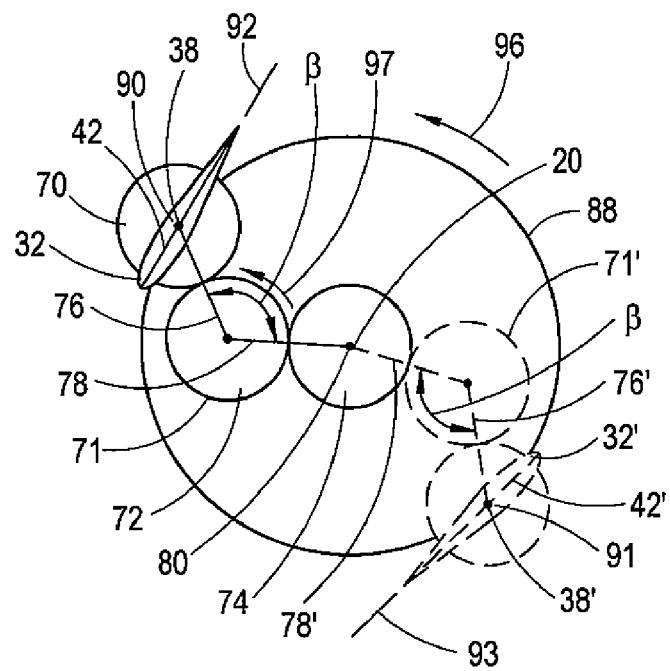
FIG. 5A is a representative view of the movement of a single gear assembly from one location of the blade path to a different location on the blade path.

By cross-referencing FIG. 4 with FIG. 5A, it can be seen that the blade gear 70 is a component of a gear assembly that is shown in FIG. 5A and designated 71. In detail, the gear assembly 71 is a combination of the blade gear 70 as well as a mid-gear 72 and a center gear 74. Further, the gear assembly 71 includes a link 76 that interconnects the center of rotation of the blade gear 70 with the center of rotation of the mid-gear 72. Similarly, a link 78 interconnects the center of rotation of the mid-gear 72 with the center of rotation of the center gear 74. At this point it is to be understood that for the present invention, the hub 30 preferably includes three separate gear assemblies 71. Accordingly, the respective center gears 74 of the gear assemblies 71 have been variously designated 74a, 74b, and 74c. However, discussions herein are often made with reference to only a single center gear 74. As such, the referenced center gear 74 may be any one of the gears 74a, 74b, or 74c.

Referring again to FIG. 4, it is shown that the center gear 74 is fixedly attached to a shaft 82. Further, the shaft 82 and the center gear 74 are co-axial. Importantly, although the center gear axis 80 and the longitudinal axis 20 are parallel, they are not necessarily co-linear. As disclosed in more detail below, relative off-set movements between the center gear axis 80 and the longitudinal axis 20 provide control over the angle of attack ($\alpha$) of the airfoil blade 32. Still referring to FIG. 4, an x-y pad 84 is shown mounted on the airship 12 so as to be moveable relative to the airship 12. Further, a guide 86 is mounted on the x-y pad 84 that is used to hold the shaft 82 stationary relative to the x-y pad 84 without hindering rotation of the shaft 82.

Referring now to FIG. 5A, a gear assembly 71 is shown at a location 90 on a blade path 88. In greater detail, the blade path 88 is the circular path that the gear assembly 71 travels in response to the rotation of the hub 30. Further, the gear assembly 71 is shown with the elements of the gear assembly 71, the center gear 74, mid-gear 72, blade gear 70, and links 76 and 78, in a particular configuration. The same gear assembly 71 is shown at a different location 91 on the blade path 88 and is designated 71'(shown by dashed lines). Importantly, at all locations on the blade path 88, the center gear axis 80 and the longitudinal axis 20 of the airship 12 are substantially, collinear. Within this configuration, it is to be appreciated that at location 90, the link 76 and the link 78 form an angle ($\beta$), and at location 91 the links 76' and 78' form the same angle ($\beta$). Also shown is the orientation of the airfoil blade 32 at location 90. As contemplated by the present invention, the angle of attack ($\alpha$) is dependent upon the orientation of the chord line 42 of the airfoil blade 32, relative to the blade path 88. In this present configuration, the chord line 42 at location 90 is substantially parallel to a line 92, which is tangent to the blade path 88 at location 90. Consequently, the airfoil blade 32 has an angle of attack ($\alpha$) of zero. Similarly, at location 91 on the blade path 88, the angle of attack ($\alpha$) is zero as well because the chord line 42' is substantially parallel to a line 93, which is tangent to the blade path 88 at location 91.

Figure 5B:
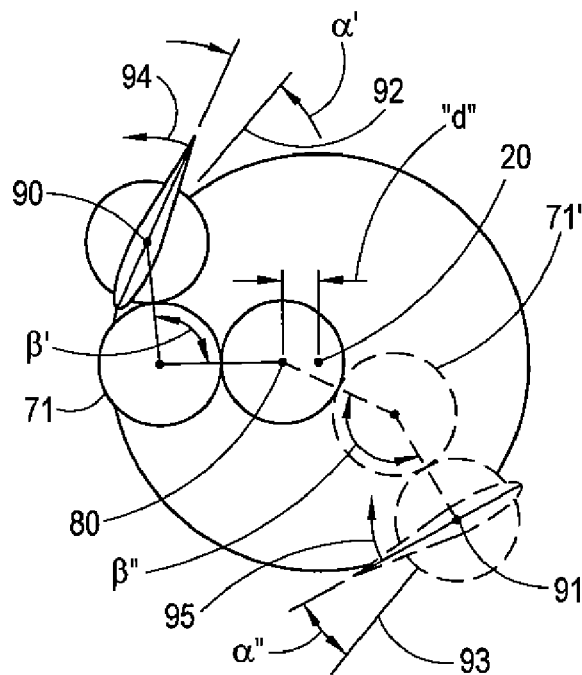
FIG. 5B is a view of the single gear assembly shown in FIG. 5A with a displacement of the center gear axis.
Figure 6:
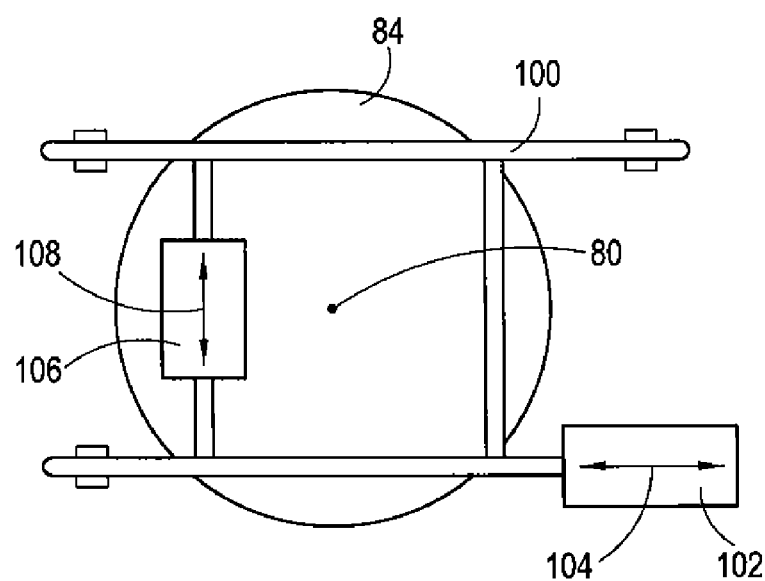
FIG. 6 is a schematic representation of a servo-control system for controlling the thrust vector of the present invention.

Referring now to FIG. 6 with cross reference to FIG. 5B, control over the respective angles of attack ($\alpha$) for the airfoil blades 32 is accomplished by collectively moving the cluster of center gears 74 omni-directionally in a plane such that the center gear axis 80 remains substantially parallel to the longitudinal axis 20 of the airship 12. In particular, the translational movement of the cluster of center gears 74 is accomplished by moving the x-y pad 84. In FIG. 6 it can be seen that to do this, a frame 100 is mounted on the airship 12 and a servo 102, which is also mounted on the airship 12 (see FIG. 1), is connected between the airship 12 and the frame 100 to move the frame 100 in a back-and-forth motion in the x-direction (indicated by the arrow 104). Another independently operated servo 106 is mounted directly on the x-y pad 84 and is connected to the frame 100 to move the frame 100 in a back-and-forth motion on the x-y pad 84 in the y-direction (indicated by arrow 108). As intended for the present invention, movement of the x-y pad 84 in its x-y plane on the airship 12 can be accomplished omni-directionally through a distance from the longitudinal axis 20 that may be as much as one half the diameter of the center gear 74.

Referring to FIG. 5B with cross reference to FIG. 5A, the center gear axis 80 has been displaced through a distance "d" from the longitudinal axis 20. As a result of this displacement, a changed configuration is shown for gear assembly 71 at location 90. In this configuration, the links 76 and 78 form an angle ($\beta'$), where $\beta'<\beta$. In addition, the chord line 42 of airfoil blade 32 has been rotationally displaced about the blade gear axis 38, in the direction indicated by the arrow 94. Importantly, the rotation of the chord line 42 from the line 92 is the angle of attack ($\alpha'$) for the airfoil blade 32. Similarly, at the location 91, the links 76' and 78' now form an angle ($\beta''$), where $\beta''>\beta$. Further, the chord line 42' of the airfoil blade 32' has been rotationally displaced about the blade gear axis 38' from line 93, in the direction indicated by the arrow 95. The rotation of the chord line 42' from the line 93 defines an angle of attack ($\alpha''$) for the airfoil blade 32'.

In operation, an operator manually or remotely activates the thruster 24 and moves the center gear axis 80 through a distance "d" from the longitudinal axis 20 of the airship 12, creating a thrust vector (T). In greater detail, there are two separate movements to consider.

Referring to FIG. 5A, the first movement is the rotation of the gear assembly 71 about the center gear axis 80 on the blade path 88. With the rotation of the hub 30 in the direction shown by the arrow 96, the airfoil blade 32 is moved along the blade path 88 in the same direction 96. This movement causes the blade gear 70 to urge against the mid-gear 72, which in turn, urges against the center gear 74. Meanwhile, the centers of the various gears 70, 72, and 74 remain connected by the respective links 76 and 78. Further, the center gear axis 80 is held substantially stationary relative to the blade path 88, and collinear with the longitudinal axis 20. In this configuration, all of the gears, 70, 72, and 74 rotate. Specifically, the blade gear 70 rotates in the direction of arrow 96, the mid-gear 72 rotates in the direction of arrow 97, and the center gear 74 rotates in the direction of arrow 96. In addition, because all of the gears 70, 72, and 74 have substantially the same diameter, as the gear assembly 71 travels along the blade path 88, the orientation of the chord line 42 of airfoil blade 32 remains substantially the same with respect to the blade path 88. For example, as the gear assembly 71 rotates from location 90 to location 91 on the blade path 88, the angle of attack ($\alpha$) of the airfoil 32 remains substantially zero. Similarly, as the links 76 and 78 rotate about the center gear axis 80, the angle ($\beta$) between the links remains constant. On the other hand, as the center gear axis 80 is displaced through a distance "d" from the longitudinal axis 20, the angle between the links ($\beta$), and subsequently the angle of attack ($\alpha$), no longer remains constant. This is best seen in FIG. 5B.

As shown in FIG. 5B with cross reference to FIG. 5A, the second movement is the displacement of the center gear axis 80 through a distance "d" from the longitudinal axis 20. As contemplated by the present invention, the center gear 74 does not rotate during the displacement. Consequently, at the location 90, the angle between links 76 and 78 decreases to less than the angle ($\beta$). As the angle between the links 76 and 78 decreases, the airfoil blade 32 rotates in the direction of arrow 94. Further, at location 91, the angle between the links 76' and 78' increases to greater than the angle ($\beta$), rotating the airfoil blade 32' in the direction of arrow 95. Importantly, the angle of attack ($\alpha'$) for the airfoil blade 32 at location 90 is equal to the difference between the angles ($\beta$) and ($\beta'$). Similarly, the angle of attack ($\alpha''$) at location 91 is equal to the difference between the angles ($\beta''$) and ($\beta$).

When the two movements are superimposed, the resulting movement is a cyclically varying angle of attack ($\alpha$) for the airfoil blade 32. Still referring to FIG. 5B with cross reference to FIG. 5A, as the gear assembly 71 rotates about the offset center gear axis 80 and travels along the blade path 88, the angle between the links 76 and 78 continuously varies. As indicated above, at any given location on the blade path 88, the orientation of the chord line 42 of the airfoil blade 32 is dependent upon the angle between the links 76 and 78. Thus, when the angle between links 76 and 78 is less than the angle ($\beta$), the chord line 42 is oriented in the direction of arrow 94. On the other hand, when the angle between the links 76 and 78 is greater than the angle ($\beta$), the chord line 42 is oriented in the direction of arrow 95. In both cases, the orientation is relative to a line tangent to the blade path 88 at the given location. This orientation of the airfoil blade 32 determines the direction of the lift force (L) generated by the airfoil blade 32. Specifically, an orientation in the direction of arrow 94 generates a lift force (L) directed to the longitudinal axis 20, and an orientation in the direction of arrow 95 generates a lift force (L) in the opposite direction.

The displacement of the center gear axis 80 from the longitudinal axis 20 determines the maximum angle of attack ($\alpha$) of the airfoil blade 32. Specifically, the further the center gear axis 80 is displaced from the longitudinal axis 20, the greater the maximum deviation of the angle between the links 76 and 78 from the angle ($\beta$). As described previously, the angle of attack ($\alpha$) is equal to the difference between the angle between the links 76 and 78, and the angle ($\beta$).

In combination, the rotational orientation of the airfoil blade 32 and the degree of displacement of the center gear axis 80 from the longitudinal axis 20 provide control over the magnitude and direction of the thrust vector (T) (best seen in FIG. 7) generated by the thruster 24.

Figure 7:
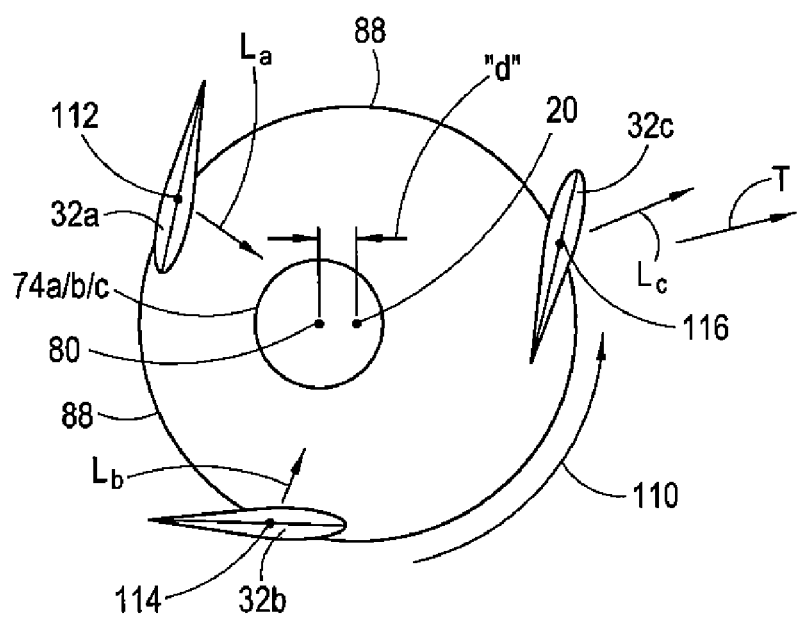
FIG. 7 is a representative view of the forces simultaneously generated by the airfoil blades with the center gear axis in a predetermined location.

As shown in FIG. 7, the hub 30 (see FIG. 4) is rotated about the longitudinal axis 20 in the direction shown by arrow 110 and simultaneously, the center gear axis 80 is moved through a distance "d" from the longitudinal axis 20. Consequently, as the airfoil blades 32 travel on the blade path 88, each airfoil blade 32 has a cyclically constant angle of attack ($\alpha$). Within this configuration, when the lift forces (L) generated by each airfoil blade 32 at any moment in time are summed, a thrust vector (T) results. For example, at location 112, the airfoil blade 32a generates a lift force ($L_a$) in a manner described previously. Similarly, at locations 114 and 116, airfoil blades 32b and 32c generate lift forces ($L_b$) and ($L_c$). When the lift forces ($L_a$, $L_b$, $L_c$) produced by airfoil blades 32a, 32b, and 32c respectively, at position 112, 114, and 116 are summed, a single thrust vector (T), as shown, results.

The direction and magnitude of the thrust vector (T) can be changed by further displacing the center gear axis 80. Specifically, with the further displacement of the center gear axis 80, the angle of attack ($\alpha$) of each airfoil blade 32 is cyclically changed. Accordingly, the lift forces ($L_a$, $L_b$, $L_c$) produced by airfoil blades 32a, 32b, and 32c are changed as well. When the lift forces ($L_a$, $L_b$, $L_c$) are again summed, a different thrust vector (T) results to accommodate the maneuvering requirements of the airship 12 during the docking procedure.

While the particular Docking System for an Airship as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for docking an airship which comprises:
   a mooring mast;
   an airship having a fore end and an aft end, said airship defining a longitudinal axis extending between the fore end and the aft end;
   a thruster fixedly mounted to the fore end of said airship for generating a thrust vector substantially perpendicular to the longitudinal axis, and for rotating the thrust vector around the longitudinal axis in a plane substantially perpendicular thereto, to maneuver the fore end of said airship; and
   a connector fixedly mounted to said thruster, wherein said connector is engagable with said mooring mast to dock said airship to said mooring mast.

2. A system as recited in claim 1 wherein said thruster comprises:
   a first hub mounted on the fore end of said airship for rotation about the longitudinal axis;
   at least one airfoil blade having a first end and a second end, with the first end positioned on said first hub for rotation therewith, wherein said blade travels on a blade path around the longitudinal axis during rotation of said first hub, and wherein said blade defines a blade axis and a chord line substantially perpendicular to the blade axis;
   a gear assembly connected to the first hub for maintaining the chord line of said blade substantially tangential to the blade path during rotation of said first hub and for rotating the chord line of said blade about the blade axis to vary an angle of attack for said blade; and
   a second hub connected to the second end of said blade for rotation about the longitudinal axis, wherein said connector is mounted on said second hub.

3. A system as recited in claim 2 wherein said gear assembly comprises:
   a blade gear mounted on said first hub, with said blade fixedly attached to said blade gear;
   a center gear oriented on said first hub for rotation around a center gear axis, wherein the center gear axis is substantially parallel to the longitudinal axis; and
   a mid-gear interconnecting said center gear with said blade gear for rotation of said blade on said blade gear around the blade axis during travel around the blade path in response to a rotation of said first hub.

4. A system as recited in claim 3 further comprising a means for rotating said first hub.

5. A system as recited in claim 3 further comprising:
   a first link having a first end and a second end with the first end thereof pivotally mounted on the center of said blade gear and the second end thereof pivotally mounted on the center of said mid-gear; and
   a second link having a first end and a second end with the first end thereof pivotally mounted on the center of said mid-gear and the second end thereof pivotally mounted on the center of said center gear.

6. A system as recited in claim 5 wherein said gear assembly comprises a means for varying a distance between the center gear axis and the blade axis to selectively change the angle of attack of said blade for controlling the thrust vector during docking of said airship to said mooring post.

7. A system as recited in claim 6 wherein said center gear has a diameter and the center gear axis is movable within a radial range from the longitudinal axis through a distance equal to approximately one half center gear diameter from the longitudinal axis.

8. A system as recited in claim 3 wherein said blade axis is substantially parallel to the longitudinal axis during rotation of said blade on the blade path around the longitudinal axis.

9. A system as recited in claim 3 wherein said blade, said blade gear, and said mid-gear, in combination, comprise a blade orientation unit and said system comprises:
   a plurality of said blade orientation units; and
   a plurality of center gears with each said center gear respectively connected to a respective blade orientation unit.

10. A system as recited in claim 3 further comprising at least one stabilizing bar fixedly connected to said first hub and said second hub.

11. A system for docking an airship to a mooring mast which comprises:
- an airship having a fore end and an aft end, said airship defining a longitudinal axis extending between the fore end and the aft end;
- a means for generating a thrust vector at the fore end of said airship, wherein said thrust vector is substantially perpendicular to the longitudinal axis;
- a means for rotating the thrust vector around the longitudinal axis in a plane substantially perpendicular thereto, to maneuver the fore end of said airship; and
- a means for engaging said airship to said mooring mast to dock said airship to said mooring mast wherein said engaging means is mounted on said generating means.

12. A system as recited in claim 11 wherein said generating means is a thruster which comprises:
- a first hub mounted on the fore end of said airship for rotation about the longitudinal axis;
- at least one airfoil blade having a first end and a second end, with the first end positioned on said first hub for rotation therewith, wherein said blade travels on a blade path around the longitudinal axis during rotation of said first hub, and wherein said blade defines a blade axis and a chord line substantially perpendicular to the blade axis;
- a gear assembly connected to the first hub for maintaining the chord line of said blade substantially tangential to the blade path during rotation of said first hub and for rotating the chord line of said blade about the blade axis to vary an angle of attack for said blade; and
- a second hub connected to the second end of said blade for rotation about the longitudinal axis.

13. A system as recited in claim 12 wherein said gear assembly comprises:
- a blade gear mounted on said first hub, with said blade fixedly attached to said blade gear;
- a center gear oriented on said first hub for rotation around a center gear axis, wherein the center gear axis is substantially parallel to the longitudinal axis; and
- a mid-gear interconnecting said center gear with said blade gear for rotation of said blade on said blade gear around the blade axis during travel around the blade path in response to a rotation of said first hub.

14. A system as recited in claim 13 wherein said blade axis is substantially parallel to the longitudinal axis during rotation of said blade on the blade path around the longitudinal axis.

15. A system as recited in claim 14 further comprising:
- a first link having a first end and a second end with the first end thereof pivotally mounted on the center of said blade gear and the second end thereof pivotally mounted on the center of said mid-gear; and
- a second link having a first end and a second end with the first end thereof pivotally mounted on the center of said mid-gear and the second end thereof pivotally mounted on the center of said center gear.

16. A system as recited in claim 15 wherein said center gear has a diameter and the center gear axis is movable within a radial range from the longitudinal axis through a distance equal to approximately one half center gear diameter from the longitudinal axis.

17. A system as recited in claim 16 wherein said rotating means comprises varying the distance between the center gear axis and the blade axis to selectively change the angle of attack of said blade for rotating the thrust vector to maneuver the fore end of said airship.

18. A system as recited in claim 17 wherein said engaging means comprises a connecter mounted on said second hub wherein said connector is engagable with said mooring mast to dock said airship to said mooring mast.

19. A method for docking an airship to a mooring mast which comprises the steps of:
- providing an airship having a fore end and an aft end, said airship defining a longitudinal axis extending between the fore end and the aft end, a thruster, which comprises a first hub mounted on the fore end of said airship for rotation about the longitudinal axis, and at least one airfoil blade having a first end and a second end, with the first end positioned on said first hub for rotation therewith, wherein said blade travels on a blade path around the longitudinal axis during rotation of said first hub, and further wherein said blade defines a blade axis and a chord line substantially perpendicular to the blade axis, and a second hub which connects to the second end of said blade for rotation about the longitudinal axis, wherein said connector is mounted on said second hub;
- activating said thruster to generate a thrust vector substantially perpendicular to the longitudinal axis;
- rotating the thrust vector around the longitudinal axis in a plane substantially perpendicular thereto, to maneuver the fore end of said airship; and
- engaging said connector to said mooring mast to dock said airship to said mooring mast.

20. A method as recited in claim 19 wherein said rotating step comprises selectively varying the orientation of each chord line of each said airfoil blade to change the direction of said thrust vector to maneuver the fore end of said airship for engaging said connector to said mooring mast to dock said airship to said mooring mast.

* * * * *